3,406,035
OPTICAL BRIGHTENERS

Gerhard Lohaus, Kelkheim, Taunus, and Karl-Heinz Lebkücher, Hofheim, Taunus, Germany, assignors to Farbwerke Hoechst Aktiengesellschaft vormals Meister Lucius & Bruning, Frankfurt am Main, Germany, a corporation of Germany
No Drawing. Filed July 15, 1965, Ser. No. 472,343
3 Claims. (Cl. 117—33.5)

ABSTRACT OF THE DISCLOSURE

The use of 9-cyananthracene as an optical brightener for polyesters.

---

It has been found that 9-cyananthracene of the formula

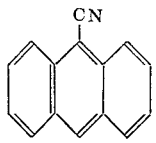

is an extremely appropriate optical brightener for material of organic polyesters.

It is known that highly crystalline polymeric materials, for example polyethylene terephthalate, are able to absorb compounds of dyestuffs or optical brighteners generally only under very limited conditions, for example above 100° C. i.e. operating at excess pressure or within a range of about 100° C. while using carriers in an aqueous bath. Thus it was surprising that the 9-cyananthracene to be used according to the present invention fixes on materials of polyesters, in particular of fibres, filaments, yarns, flakes, felts, fabrics, knit goods, foils or films in a satisfying speed, already at comparatively low temperatures, i.e., approximately 60° C. in an aqueous dispersion whereby it may be advantageous to add the usual cation active, anion active or neutral dispersion agents.

As polyesters, in particular as linear polyesters, there may be used for example polyalkyleneterephthalates, in which in the recurring units

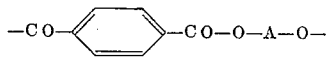

A represents an organic hydrocarbon radical, preferably a bivalent aliphatic radical of 2 to about 18, advantageously 2–10 carbon atoms, or an aliphatic-cycloaliphatic radical. It is preferred to use polyethylene terephthalate.

In the recurring structural unit of the polyester, the terephthalic acid radical may be replaced in part, for example up to about 20%, by the radical of another dicarboxylic acid, for example isophthalic acid, hexahydroterephthalic acid, adipic acid, sebacic acid and others of similar nature, or to a minor extent by a tricarboxylic acid radical. There may also be used for brightening carried out according to the present invention polycarbonates which are also polyesters.

Compared with the optical brighteners for polyesters hitherto used in practice, the special advantage of the use of the 9-cyananthracene resides in the fact than an optical brightening is effected under ordinary washing conditions. Thus the brightener to be used according to the present invention may appropriately be added to detergents. It is also possible to add this brightener to rinsing or finishing agents. Because of its great effectiveness, the brightener may be used in very low concentration. The optical brightener to be used according to the present invention is generally employed in concentrations up to about 0.1% as referred to the weight of the goods; in most cases, however, concentrations of up to 0.08% are sufficient.

For the brightening according to the present invention, the periods of treatment range in general from 5 to 60 minutes, preferably from 10 to 30 minutes. The periods of treatment may be varied at choice without encountering any disadvantages. A considerable increase of the concentration of the 9-cyananthracene in the bath above the values mentioned above does in most cases not improve the brightening effect; when using too high a concentration the brightening effect may be reduced.

Since the 9-cyananthracene is thermally very stable, the brightener may be added to the polyester material already before or during shaping to filaments, foils etc. in spinning, extruding or molding.

The optical brightenings obtained by means of the 9-cyananthracene have very good fastness to light and washing.

The compound to be used according to the present invention is easily accessible. It can be prepared according to methods known in the art, for example by allowing cyanogen bromide to act on anthracene in the presence of aluminum chloride, by reacting 9 - bromoanthracene with copper-(I)-cyanide, by dehydrating anthracene-9-aldoxim or, in a specially simple manner according to the process described in patent application in the United States No. 407,545 filed Oct. 29, 1964, by allowing a carboxylic acid amide such as dimethylformamide to act on the anthracene-9-carboxylic acid amide-N-sulfochloride easily accessible from anthracene and $ClSO_2NCO$ (Liebigs Ann. Chemie 661, 140 (1963)).

It is advantageous to carry out the reaction in the presence of solvents or diluents at temperatures ranging from —30° C. to +120° C., preferably at 0° C. to 50° C.

The following examples serve to illustrate the invention but they are not intended to limit it thereto.

EXAMPLE 1

A bleached fabric of polyethyleneglycolic terephthalate fibres is treated at a goods to liquor ratio of 1:20 for 30 minutes at 65° C. with an aqueous dispersion containing 0.04 g. of 9-cyananthracene per litre.

Compared with an untreated fabric, the treated fabric exhibits a far more brilliant white shade after rinsing and drying. The degree of white, measured on the Zeiss-Elrepho apparatus at a wave length of 460 m$\mu$ against magnesium oxide as standard (100%), was increased from 82% to 92% when treating the fabric in the above manner.

EXAMPLE 2

A polyethyleneglycolic terephthalate fabric bleached in the usual manner is washed at a goods to liquor ratio of 1:30 for 10 minutes at 70° C. in a bath containing per litre 3 g. of a gentle detergent of the following composition:

| | Percent |
|---|---|
| Alkylarylsulfonate | 21 |
| Addition product of 8 mols of ethylene oxide on 1 mol of oleylic amine | 6 |
| Potassium pyrophosphate | 10 |
| p-Toluenesulfonate-sodium salt | 8 |
| Water | 65 | in addition to 0.004 g. of the 9-cyananthracene dispersed therein. After ten washings the brightener forms no accumulations in the fabric which remains pure white.

We claim:
1. A process for the optical brightening of a high molecular weight linear polyester which comprises absorbing from 0.01 to 0.1 percent of 9-cyananthracene into said polyester, said percentages being by weight of said polyester.

2. A process as in claim 1 wherein 9-cyananthracene is absorbed into said polyester prior to or during the shaping thereof into filaments or foils.

3. A process as in claim 1 wherein 9-cyananthracene is absorbed into said polyester in the form of a filament or foil at a temperature up to about 100° C. from an aqueous bath containing 9-cyananthracene dispersed therein.

No references cited.

LEON D. ROSDOL, *Primary Examiner.*

S. D. SCHWARTZ, *Assistant Examiner.*